June 19, 1951  F. H. GREEN  2,557,099
AIRCRAFT COOLING SYSTEM
Filed Oct. 24, 1947
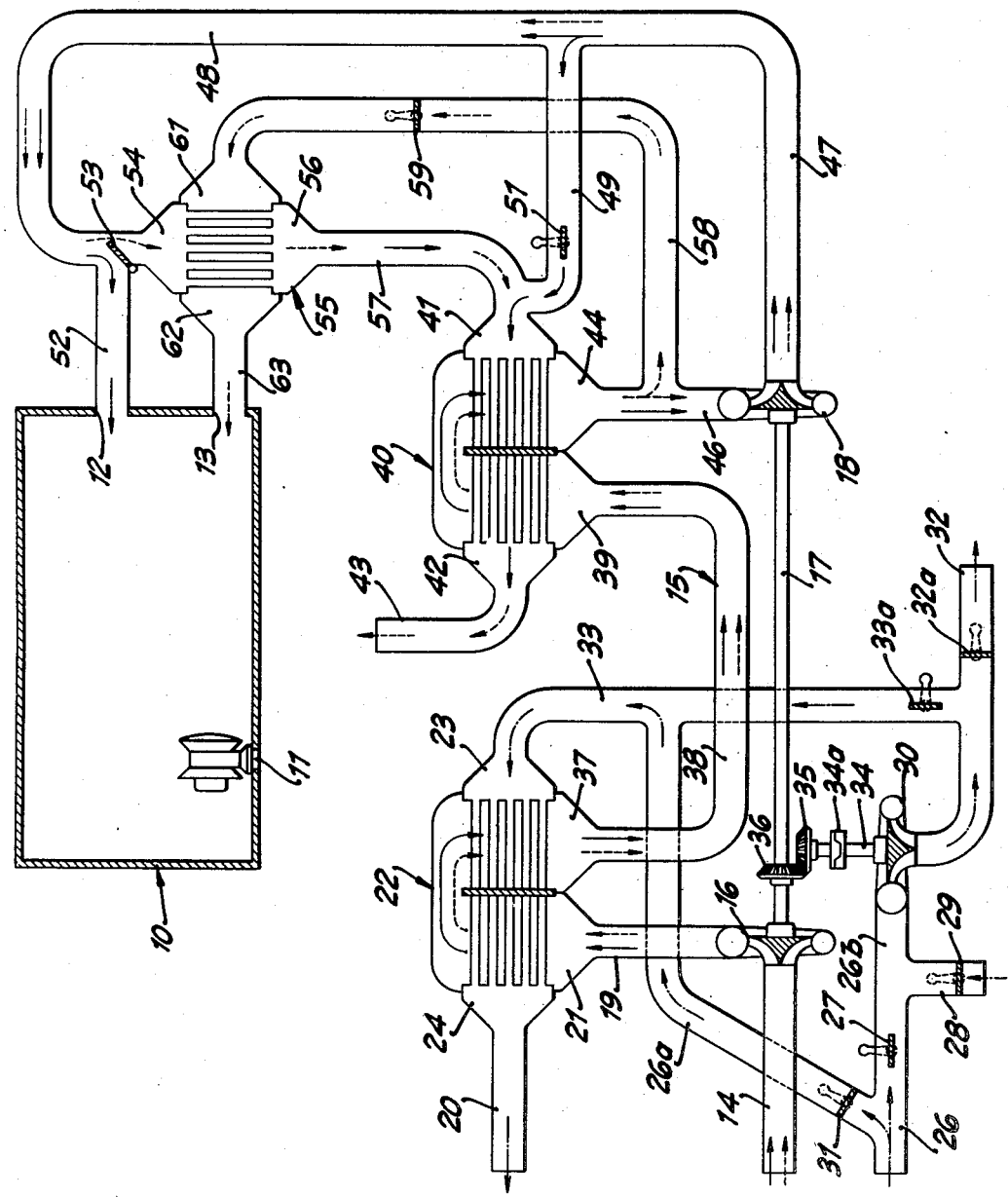
FREDERICK H. GREEN,
INVENTOR
BY John H. J. Wallace Patented June 19, 1951

2,557,099

UNITED STATES PATENT OFFICE 2,557,099

AIRCRAFT COOLING SYSTEM

Frederick H. Green, Los Angeles, Calif., assignor to The Garrett Corporation, Los Angeles, Calif., a corporation of California Application October 24, 1947, Serial No. 781,802

17 Claims. (Cl. 62—136)

The present invention relates to air conditioning systems in general and particularly to an air conditioning system for aircraft. More specifically the invention comprises a cooling and ventilating system for aircraft adapted to travel at high speeds within a range varying from sea level to extremely high altitudes, up to possibly 80,000 feet or even higher, depending upon various factors.

The problem of conditioning the cabin air in high speed aircraft is of extreme importance and involves variables which lend complexity to its satisfactory solution. With the speed of airplanes increasing into the trans-sonic and supersonic ranges, an aircraft travelling at low altitude at such high speeds through relatively dense atmosphere is greatly heated by the adiabatic compression of the surrounding air occasioned by the passage of the aircraft through it, and also by the friction of the air upon the surface of the aircraft, called skin friction. This heat, which is transmitted to the interior of the plane, must be eliminated if it is not to be a limiting factor upon maximum speed. At high altitudes, in which the ambient atmosphere is less dense, the heat of adiabatic compression and skin friction becomes of lesser importance and instead pressure becomes a controlling factor. The pressure of the ambient atmosphere at extremely high altitudes is much below that suitable for the maintenance of human life and it becomes necessary to pressurize the passenger cabin. Within the structural limitations of the plane, and of the capacity of the air conditioning system, cabin pressure can be maintained at, or sufficiently close to, normal atmospheric pressure at sea level. The well designed system must, therefore, be able not only to accommodate itself to the reduction of temperature at low altitudes, but also to the maintenance, at high altitudes, of cabin pressures corresponding to those at low altitudes, under which circumstances heat rejection may be less important.

Air conditioning systems for aircraft have heretofore attempted to meet the requirements of high speed low and high altitude flying, but have not provided the desired flexibility which must be present in the well designed system. With the recognition of the factors involved in the problem and of the shortcomings of the prior systems, it is an object of the present invention to provide a relatively simple air conditioning system for aircraft capable of providing maximum cooling for low altitude high speed flying and maximum pressurization for high altitude high speed flying. The invention is particularly adapted for the conditioning of aircraft cabins, but it is to be understood that it is also adapted for use in other relationships where the conditions and factors present are comparable.

It is another object of the invention to provide a cooling system for high speed aircraft, and by the term high speed is meant speeds approaching and within the supersonic range, in which the available energy head of the moving aircraft is partially converted into work effective to change the pressure and temperature levels in an air flow into the aircraft cabin. The relative velocity existing between the plane and the ambient atmosphere is useful initially to compress the intake air which subsequently has its temperature lowered by expansion in an energy-absorbing unit, the energy from which is used to drive compressing means at the higher temperature level.

A still further object of the invention is to provide an improved aircraft cooling system embodying a plurality of heat exchange units and pressure-level-varying units selectively interconnectable to control the pressure and temperature of cabin air. The pressure-level-varying means as embodied in the invention may also vary the temperature levels of the fluid medium upon which they work, or from which they extract work, and, according to the invention, are so arranged and usable selectively as to provide the desired pressure and temperature relationship in the cabin air.

It is still another object of the invention to provide an aircraft cabin pressurization and ventilation system in which air from the ambient atmosphere is successively compressed, cooled and expanded under the control of selective means for the purpose of delivering properly conditioned air to the aircraft cabin, due regard being had to external conditions to which the plane is simultaneously subjected, in order to provide for the comfort of the cabin passengers.

A still further object of the invention is to provide an improved cooling system for aircraft in which ram air taken aboard the aircraft for cabin atmosphere conditioning purposes has its temperature lowered by being brought into heat transfer relationship to a secondary flow of ram air which has been brought to a lower temperature by the extraction of work, which work may be used effectively to increase the energy level of the air stream to the cabin.

A further object of the invention is to provide an aircraft cabin pressurization and ventilation system in which air from the ambient atmosphere is compressed at high speeds by the expenditure of energy by the air itself, and at low speeds by the expenditure of energy derived from bleed air from the turbo jet compressor or other source of air under pressure on the aircraft.

These and other more specific objects will appear upon reading the following specification and claims and upon consideration of the drawing.

Referring now to the drawing, in which a preferred embodiment of the invention is shown schematically for purposes of illustration only, the enclosure or compartment to be conditioned is indicated generally by the reference character 10 and may be considered to be the cabin of a high speed aircraft, such as the cockpit of a fighter plane, or any pressurized compartment of a vehicle or missile adapted to be moved through the atmosphere at high speed. The present invention is directed to a system to maintain air within such a compartment under pressure and to replace that air which has leaked to the exterior or which has been permitted to escape through a controlled outlet 11 provided for the purpose, it being clear that ventilation inherently involves the displacement of air from within the closed chamber. Except for outlet 11 and imperfections in its mechanical construction, cabin 10 is sealed against leakage and into this sealed chamber two inlets 12 and 13 are provided.

The air which ultimately enters the cabin through inlets 12 and 13 may be ram air, that is, air which is literally scooped from the ambient atmosphere by the aircraft in its movement therethrough. This ram air enters the conditioning system at the inlet of ram duct 14 which comprises a part of the cabin air conducting means, indicated generally by the reference character 15, which also includes, as will be described, an interconnected series of ducts, heat exchangers, work-absorbing and work-expending means, and control valves. Ram air passes from ram duct 14 through a compressor 16 which may be of the centrifugal type as shown and in which the already relatively high pressure and temperature of the air are further raised. The rotor of compressor 16 is connected by a shaft 17 to the rotor of a turbine 18 driven by power expended by the cabin air stream. From the compressor 16 the incoming air passes through a duct 19 into the cooling passages 21 of a heat exchanger indicated generally at 22, in which it is partially cooled by passing in heat exchange relationship with coolant air at a lower temperature passing through the coolant passages 23. The coolant air passes from the heat exchanger at the outlet 24 and into a duct 20 by which it is dumped overboard at a point at which it may enter the surrounding air stream with a minimum of disturbance.

The coolant for heat exchanger 22 comprises ram air and preferably ram air from which heat has been extracted. The flow of coolant air enters the system through a secondary ram duct 26 and, depending upon whether the aircraft is travelling at low speed or at high speed, passes to the heat exchanger 22 through conduits 26a and 33, or through conduit 26b, a work-extracting turbine 30, and conduit 33. If the aircraft is travelling at high enough speed, for example, at supersonic speed, the pressure of ram air is sufficient to drive the turbine 30, the valve 27 in conduit 26b is open, and valve 31 in conduit 26a is closed. The coolant air temperature is lowered by the extraction of work in turbine 30 so that the air is capable of extracting a greater quantity of heat in heat exchanger 22. At slow speeds, however, valve 27 is closed, and instead, valve 31 in conduit 26a is opened to permit the flow of coolant air. The temperature of the coolant air entering heat exchanger 22 is substantially that of ram air which, however, is lower than the temperature of the cooling air in passages 21 of the exchanger because of the temperature rise occasioned by the action of compressor 16.

Also, when travelling at relatively low speed the energy available from the cooling air may not be sufficient to provide adequate power to the turbine 18 driving the compressor 16. The function of the latter is essential, and if adequate power is not available from turbine 18, then it must be provided by the turbine 30 and must be obtained from an outside source. To provide that power a conduit 28 having a valve 29 and leading to conduit 26b is connected to a source of air, which may be air bled from the compressor of the propelling turbine of the aircraft. This bleed air is higher in temperature than ram air, even after passing through turbine 30, and so is not suitable as a coolant for the exchanger 22. Accordingly coolant to the exchanger continues to be ram air fed through conduit 26a, the valve 31 being in its open position. The bleed air passes through and delivers power to turbine 30 and is exhausted to atmosphere through outlet duct 32, the valve 32a being in open position. In this mode of operation valve 33a in conduit 33 is closed to prevent the passage of the expanded bleed air to the heat exchanger 22, for, as previously stated, its temperature is still too high under these conditions to permit its use as a coolant, despite the fact that it has been lowered in temperature by passing through turbine 30.

The power received by the coolant turbine 30 is transmitted to the shaft 17, connected between compressor 16 and turbine 18, by means of a shaft 34 and gears 35 and 36. Preferably an overrunning clutch 34a is positioned between the ends of shaft 34 to disconnect turbine 30 when it is not delivering power.

The main air flow emerges from heat exchanger 22 at outlet 37 and enters a duct 38, by which it is conveyed directly to the cooling passages 39 of a second heat exchanger indicated generally by the reference character 40. As in the case of first heat exchanger 22, coolant passages 41 traverse heat exchanger 40 in heat transfer relationship to the cooling passages 39, the coolant emerging therefrom at the outlet 42 to be carried away in a duct 43 and dumped overboard. The coolant in the coolant passages 41 comprises a portion of the main air-stream itself which has been selectively diverted, as will presently be described.

The main air flow emerges from heat exchanger 40 at outlet 44 and is conveyed, for reasons presently to be described, by a duct 46 directly to the aforementioned air turbine 18 to which it delivers work as previously described, the work being used to drive the compressor 16. The extraction of this work from the air results in a further lowering of its temperature. Duct 47, into which the air passes upon leaving turbine 18, divides into ducts 48 and 49, the latter connecting directly to the coolant passages 41 of heat exchanger 40 and including a control valve 51. Conduit 48 connects directly to the inlet duct 52 which leads to the cabin inlet 12. Conduit 48 also opens to the coolant passages 54 of a third heat exchanger indicated generally by the reference character 55. A proportioning valve 53 controls the admission of air to either the cabin inlet 12 or to the heat exchanger 55, or partially to both, as may be desired. Air from heat exchanger 55 emerges from the coolant outlet 56 into a duct 57 which, in the manner of aforementioned duct 49, connects directly to the coolant passages 41 of heat exchanger 40. It will be seen that the coolant air through the exchanger paths illustrated are exemplary only and that variations thereof are within the scope of the invention and are permitted by the proper positioning of the control valves in the various conduits between the full open and full closed positions. The following chart sets forth various valve relationships which may be considered as preferred for the respectively indicated operating conditions:

| Conditions | | | Valves | | | | | | | |
|---|---|---|---|---|---|---|---|---|---|---|
| Altitude | Speed | Ambient Air Temp. | 53 | 59 | 51 | 27 | 29 | 31 | 32a | 33a |
| Low | Low | Low | Modulating | Closed | Open | Closed | Open | Open | Open | Closed |
| Do | do | High | do | do | do | do | do | do | do | Do |
| High | do | Low | Closed to cabin | Open | Modulating | do | do | do | do | Do |
| Do | do | High | do | do | Closed | do | do | do | do | Do |
| Low | High | Low | Modulating | Closed | Open | Open | Closed | Closed | Closed | Open |
| Do | do | High | do | do | do | do | do | do | do | Do |
| High | do | Low | Closed to cabin | Open | Modulating | do | do | do | do | Do |
| Do | do | High | do | do | Closed | do | do | do | do | Do |

40 comprises air from either or both of two flows diverted from the main airstream to the cabin. As the conduit 49 provides a more direct connection, the coolant fluid to heat exchanger 40 passing therethrough may be at a lower temperature than that arriving by way of duct 48 and connected exchanger 55 and duct 57. Depending upon the relative proportion of the air flowing through these two passages the exchange of heat in heat exchangers 40 and 55 can be varied and the temperature of the cabin air controlled.

Referring again to the duct 46 leading from the coolant outlet 44 of the heat exchanger 40, attention is directed to the conduit 58 connecting directly to the cooling passage 61 of heat exchanger 55 and provided with a control valve 59. Air passing through duct 58 by-passes the heat-extracting turbine 18, and so is at a higher temperature than air in duct 47, but by the same token it is at a higher pressure for it has not been expanded. On passing through the heat exchanger 55 air from conduit 58 emerges at outlet 62 into a duct 63 connecting directly to the second cabin inlet 13. In the exchanger 55 the air flowing toward the cabin again gives up heat to the coolant air which has passed through turbine 18, its first contact therewith in such mode of operation having been in exchanger 40. The supplemental effect of this second contact is further to reduce the temperature of the air so that it enters the cabin through inlet 13 at a temperature which, while higher than the temperature of air entering through inlet 12, is yet substantially within the same usable range.

For purposes of explanation of the operation of the system comprising the present invention, and to illustrate more clearly the flow of air therethrough under various conditions, arrows have been placed in the ducts and heat exchangers. The solid shaft arrow is intended to indicate that flow of air which takes place when the aircraft is operating at relatively low altitudes and at which the need for pressurization is a minimum and the need for cooling is at a maximum. The broken shaft arrows indicate the flow of air which takes place within the system with the aircraft operating at relatively high altitudes at which the need for pressurization is greatest and the need for heat removal a minimum. The dash-dot-dash shaft arrow indicates the direction of flow of air through the secondary or coolant circuit of the first heat exchanger 22. It is to be understood, however, that the air Considering first the operation of the aircraft at low altitude, the atmosphere through which the craft is passing is of maximum density and, accordingly, the heat of skin friction will be relatively great, as will the heat resulting from adiabatic ram compression. The ambient atmospheric pressure, however, is suitable for the interior of the plane, and the system, therefore, is primarily concerned with heat elimination, and the arrangement or internal relationship which will best effect such a result is to be preferred.

At such low altitude, and at low speed with low ambient temperature, ram air enters the cabin air conducting means at the ram duct 14 under ram pressure and is further compressed by the compressor 16 driven by the turbine 18, and at times, also by turbine 30. Its temperature, already high because of ram compression, will be further raised. Upon passing through heat exchanger 22 a part of its heat is removed by the coolant air entering from duct 33. With the aircraft travelling at low speed, ram air entering through duct 14 is not adequate to provide sufficient power to turbine 18 for compressor 16, and supplemental power from turbine 30 is added as it becomes desirable. Accordingly valve 27 is closed while valve 31 is opened to permit ram air to flow through conduit 26a to exchanger 22 as a coolant. Turbo jet compressor bleed air enters past open valve 29 in conduit 28 and passes through conduit 26b to deliver work to turbine 30, which is connected to the compressor shaft 17 as described. Valve 33a is closed, and after leaving the turbine the bleed air is dumped overboard through conduit 32, the valve 32a being in open position.

Emerging from first heat exchanger 22, the main air stream is conducted directly to second heat exchanger 40 where it flows in regenerative heat exchange relationship to coolant air which previously has followed the same course up to this point in the system. Upon leaving exchanger 40 it is conducted through duct 46 to the cooling or work-extracting turbine 18, valve 59 in conduit 58 being in the closed position, and thence through conduits 47 and 48 to the inlet duct 52 in which the valve 53 is positioned in the open position as illustrated. A portion of this air, however, and this is a variable depending upon the position of valve 53, does not enter the cabin but instead continues on through exchanger 55, which is inoperative as no air is flowing thereto through conduit 58, and through conduit 57 back to exchanger 40 in which it acts as a coolant. The valve 51 in duct 49 is positioned in its open position, as illustrated, and a large part of the air in duct 47 flows directly from the turbine 18 to heat exchanger 40 to serve as a coolant and without traversing the longer passage described. The volume of air flow into the cabin can be controlled by the valve 53 and the modulation of valves 51 and 53 effectively regulates both the temperature and the quantity of the air entering the cabin.

Upon the increase in the operating speed of the plane into the range which can be called high speed, that is, 550 miles per hour to supersonic speeds, only slight changes in the valves are required. Due to increased ram pressure the bleed air from the turbo compressor may be dispensed with and ram air used as a source of turbine power. Additionally at the higher speeds it may be undesirable to bleed air from the turbo compressor. Accordingly, valves 29, 31 and 32a are closed while valves 27 and 33a are opened.

Considering now the operating relationships at high altitude and at low speed, the problem of heat elimination is of lesser importance for the air is of lesser density, adiabatic compression and skin friction are greatly reduced, and the temperature of the air upon entering is lower. Because of the low speed, reliance will again be placed upon turbo bleed air for a portion of the driving power for the compressor 16, and valve 29 will be open, valve 32a will be open, and valve 33a will be closed, and valve 27 is closed to prevent relatively high pressure bleed air from escaping back out duct 26. Coolant air to the heat exchanger 22 would again be obtained through the conduits 26, 26a and 33, the valve 31 being in its open position. If the ambient temperature is low, valve 51 would be in a modulating position. The air flow through the system at high altitude is indicated by the broken shaft arrows, and it is noted that the pathway is identical with that of the solid arrows representing low altitude operation until their emergence from the outlet 44 of heat exchanger 40. At that point the air flow represented by the broken arrows divides between the conduits 58 and 46. A minor portion of the airstream passes through conduit 58, the valve 59 of which is now open, continues through heat exchanger 55 and conduit 63 directly into the cabin at inlet 13. A major portion of the air in this operation passes through turbine 18 and ducts 47, 48, into inlet 54, valve 53 being suitably positioned, and through heat exchanger 55, conduit 57 and heat exchanger 40 from which it passes to atmosphere. The cabin air in this instance travels directly into the cabin without passing through the heat-extracting pressure-reducing turbine 18.

In the event the plane while travelling at high altitude enters the high speed range the valve positions would need to be varied only slightly; in fact, the valves could remain in the positions described with the exception of the valves in the coolant circuit of heat exchanger 22, all of which would be reversed. At the higher speed ram air would be used to drive the turbine 30 and accordingly valves 31 and 29 would be closed. Valve 27 would be open as would valve 33a, but valve 32a would be closed. Coolant to the exchanger 22 would be provided through conduit 26, turbine 30 and conduit 33. As in the low speed operation, variations in ambient temperature would be accommodated by modulating valve 51 or other valves as desired. It is to be understood that the valve relationships proposed are subject, of course, to variation, as may be necessary to obtain a desired temperature, the system being operative with such variations and with the valves modulated therewithin.

I claim:

1. In a system embodying a path of flow for a gaseous fluid to an aircraft compartment to be conditioned therewith, the combination of said path of: the cooling passages of heat exchange means, a plurality of passages connecting the cooling passages of said heat exchange means to said compartment, one of said passages including the casing of a work-extraction engine, and means for directing the fluids flowing through said passages in segregated heat exchange relationship with each other.

2. In a system embodying a path of flow for a gaseous fluid to an aircraft compartment to be conditioned therewith, the combination in said path of: heat exchange means including cooling and coolant passages, passages in parallel connecting the cooling passages of said heat exchange means to said compartment, one of said parallel passages including the casing of a heat-absorbing work-extraction engine, and means for directing fluid flowing through said one of said parallel passages to the coolant passages of said heat exchange means and including the coolant passages of a second heat exchange means forming a part of the other of said parallel passages.

3. In a system employing heat exchange means for cooling the atmosphere of an aircraft compartment supplied from a source of fluid under pressure, the combination of: pumping means to increase the pressure of the incoming fluid from said source, first and second heat exchange means each including cooling passages for the fluid from said pumping means and coolant passages, means to direct fluid from said source through the cooling passages of said first and second heat exchange means, a plurality of passages connecting said second heat exchange means to said compartment, one of said plurality of passages including the casing of a heat-removing work-extraction engine, and means to direct fluid from said one of said plurality of passages to the coolant passages of said second heat exchange means.

4. In a system employing heat exchange means for cooling the atmosphere of an aircraft compartment supplied from a source of fluid under pressure, the combination of: pumping means to increase the pressure of the incoming fluid from said source, first and second heat exchange means each including cooling passages for the fluid from said pumping means and coolant passages, means to direct fluid from said source through the cooling passages of said first and second heat exchange means, a plurality of passages connecting said second heat exchange means to said compartment, one of said plurality of passages including the cooling passages of a third heat exchange means, a second of said plurality of passages including the casing of a heat-removing work-extraction engine, and means to direct fluid from said second of said plurality of passages to the coolant passages of said third and second heat exchange means.

5. The structure recited in claim 4 characterized in that said fluid from the second of said plurality of passages passes through the coolant passages of said third and second heat exchange means and in that order.

6. The construction recited by claim 4 characterized in that said last mentioned means to direct fluid includes means to direct said fluid directly to the coolant passages of said second heat exchange means and also means to direct said fluid through the coolant passages of said third and second heat exchange means in that order.

7. The construction recited in claim 4 in which means including valve means are provided to direct and to control a flow of fluid from said heat-removing work-extraction engine to the coolant passages of said second heat exchange means.

8. A conditioning system for the fluid atmosphere within an aircraft compartment comprising: conduit means connecting a source of compressed fluid for said atmosphere with said compartment, heat exchanger means in said conduit means, pumping means in said conduit means for raising the energy level of said fluid prior to entering said exchanger means, a work extraction engine in said conduit means at the discharge from said heat exchanger means and driven by the fluid discharging therefrom, driving means connecting said engine with said pumping means, second conduit means connecting a source of coolant fluid under pressure with said heat exchanger means in order to supply coolant fluid thereto, a work extraction engine in said second conduit means and driven by the flow of coolant fluid therein, and driving means connecting said pumping means with said last named work extraction engine.

9. A conditioning system for the fluid atmosphere within an aircraft compartment comprising: conduit means connecting a source of compressed fluid for said atmosphere with said compartment, heat exchanger means in said conduit means, pumping means in said conduit means for raising the energy level of said fluid prior to entering said exchanger means, a work extraction engine in said conduit means at the discharge from said heat exchanger means and driven by the fluid discharging therefrom, driving means connecting said engine with said pumping means, second conduit means connecting a source of coolant fluid under pressure with said heat exchanger means in order to supply coolant fluid thereto, and a work extraction engine in said second conduit means, said engine being driven by the flow of coolant fluid therein.

10. In a system embodying a path of flow for a gaseous fluid to a compartment to be temperature conditioned therewith, the combination in said path of: the cooling passages of heat exchange means; a plurality of passages leading from said cooling passages to said compartment; one of said plurality of passages including a work-extraction engine, and another of said plurality of passages including the cooling passages of further heat exchange means; and means for directing the fluid flowing through said first named cooling passages and the fluids flowing in said plurality of passages selectively into heat exchange relationship with each other.

11. In a system embodying a path of flow for a gaseous fluid to a compartment to be temperature conditioned therewith, the combination in said path of: the cooling passages of heat exchange means; a plurality of passages leading from said cooling passages to said compartment; one of said plurality of passages including a work-extraction engine, and another of said passages including the cooling passages of further heat exchange means; and means for directing the fluid flowing from said work-extraction engine selectively either into heat exchange relationship with the fluid in said first named heat exchange means, or into said compartment, or into heat exchange relationship with the fluid flowing in said other of said plurality of passages.

12. A conditioning system for the fluid atmosphere within a compartment comprising: conduit means connecting a source of compressed fluid for said atmosphere with said compartment; heat exchanger means in said conduit means; pumping means in said conduit for increasing the heat content and pressure of said fluid prior to entering said heat exchanger means; a work-extraction engine in said conduit means at the discharge end of said heat exchanger means and driven by the fluid discharging therefrom; driving means connecting said engine with said pumping means; second conduit means connecting a source of coolant fluid under pressure with said heat exchanger means in order to supply coolant fluid thereto; and a work-extraction engine in said second conduit means, said engine being driven by the flow of coolant fluid therein.

13. In a system employing heat exchange means for conditioning the atmosphere of an aircraft compartment supplied from a source of fluid under pressure, the combination of: conduit means connecting a source of compressed fluid for said atmosphere with said compartment; energy level increasing pumping means in said conduit means; a plurality of heat exchanger means having cooling and coolant passages associated with said conduit means; a plurality of passages connecting the cooling passages of said heat exchanger means with said compartment; a heat extraction engine in one of said plurality of passages, said heat extraction engine being operatively connected to said pumping means; a first coolant supply means for one of said heat exchanger means; and a second coolant supply means for the remainder of said heat exchanger means.

14. A conditioning system for the fluid atmosphere within a compartment comprising: conduit means connecting a source of fluid under pressure with said compartment; heat exchanger means in said conduit means; pumping means in said conduit means for increasing the heat content and pressure of said fluid prior to entering said heat exchanger means; a plurality of passages connecting the cooling passages of said heat exchanger means with said compartment; a pressure reducing expansion engine in one of said plurality of passages; means for directing the flow of fluid through said plurality of passages to control the pressure of the fluid delivered to said compartment; a first coolant supply means for one of said heat exchanger means; and a second coolant supply means for the remainder of said heat exchanger means.

15. A compartment conditioning system comprising: conduit means connecting a source of fluid under pressure with said compartment; heat exchanger means in said conduit means; pumping means in said conduit means for increasing the heat content and pressure of said fluid prior to entering said heat exchanger means; a plurality of ducts leading from the cooling passages of said heat exchanger means into said compartment; a fluid expander in one of said plurality of ducts; and means for proportioning the flow of fluid through said plurality of ducts to control the pressure of the fluid in said compartment.

16. A conditioning system for the fluid atmosphere within a compartment comprising: conduit means connecting a source of fluid under pressure with said compartment; heat exchanger means in said conduit means; means in said conduit means for raising the energy level of said fluid prior to entering said heat exchanger means; a plurality of passages connecting the cooling passages of said heat exchanger means with said compartment; an energy-absorption engine in one of said plurality of passages; means for proportioning the fluid through said plurality of passages to control the pressure of the fluid atmosphere within said compartment; second conduit means connecting a source of coolant fluid under pressure with said heat exchanger means; and a work extraction engine in said second conduit means, said engine being driven by the flow of coolant fluid therein.

17. A conditioning system for the fluid atmosphere within a compartment comprising: first conduit means connecting a source of fluid under pressure with said compartment; plural heat exchanger means in said conduit means; pumping means upstream of said heat exchanger means; an energy extracting expansion engine downstream of one of said plural heat exchanger means, said expansion engine being connected to said pumping means; second conduit means supplying coolant to one of said plural heat exchanger means from a second source of relatively cool fluid under pressure; a third source of hot fluid under pressure additionally connected to said second conduit means; a second energy extracting engine operatively associated with said second conduit means so as to be driven by the flow of fluid from either of said second or third sources of fluid under pressure; and means for optionally transmitting energy between said second engine and said pumping means.

FREDERICK H. GREEN.

REFERENCES CITED

The following references are of record in the file of this patent:

UNITED STATES PATENTS

| Number | Name | Date |
|---|---|---|
| 2,328,489 | Pfau | Aug. 31, 1943 |
| 2,391,838 | Kleinhans | Dec. 25, 1945 |
| 2,412,110 | Williams | Dec. 3, 1946 |

Certificate of Correction

Patent No. 2,557,099

June 19, 1951

FREDERICK H. GREEN

It is hereby certified that error appears in the printed specification of the above numbered patent requiring correction as follows:

Column 8, line 6, for "of said" read *in said*;

and that the said Letters Patent should be read as corrected above, so that the same may conform to the record of the case in the Patent Office.

Signed and sealed this 18th day of September, A. D. 1951.

[SEAL]

THOMAS F. MURPHY,
*Assistant Commissioner of Patents.*